United States Patent
Fontana et al.

(10) Patent No.: US 11,068,937 B1
(45) Date of Patent: Jul. 20, 2021

(54) SYSTEMS AND METHODS FOR DETERMINING REAL TIME AVAILABLE CAPACITY OF A MERCHANT

(71) Applicant: Wells Fargo Bank, N.A., San Francisco, CA (US)

(72) Inventors: Laura M. Fontana, San Francisco, CA (US); Kristine Ing Kushner, Orinda, CA (US); Muhammad Farukh Munir, Pittsburg, CA (US); Brian M. Pearce, Pleasanton, CA (US); Paul Vittimberga, Oakland, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 250 days.

(21) Appl. No.: 15/809,810

(22) Filed: Nov. 10, 2017

Related U.S. Application Data (60) Provisional application No. 62/439,331, filed on Dec. 27, 2016.

(51) Int. Cl.
   *G06Q 30/02* (2012.01)
   *G06Q 10/06* (2012.01)

(52) U.S. Cl.
   CPC ... *G06Q 30/0259* (2013.01); *G06Q 10/06393* (2013.01); *G06Q 30/0261* (2013.01); *G06Q 30/0267* (2013.01); *G06Q 30/0272* (2013.01)

(58) Field of Classification Search
   CPC ............. G06Q 10/0631; G06Q 30/0261
   See application file for complete search history.

(56) References Cited

U.S. PATENT DOCUMENTS

| | | | |
|---|---|---|---|
| 6,741,969 B1 * | 5/2004 | Chen | G06Q 10/02 705/1.1 |
| 8,176,159 B2 | 5/2012 | Kashi | |
| 8,744,958 B2 | 6/2014 | Carlson et al. | |
| 8,774,758 B2 | 7/2014 | Davis et al. | |
| 8,955,066 B1 | 2/2015 | Ackerman et al. | |
| 9,043,887 B2 | 5/2015 | McLachlan et al. | |

(Continued)

FOREIGN PATENT DOCUMENTS

| | | | |
|---|---|---|---|
| WO | WO01/07987 A2 | 2/2001 | |
| WO | WO-0107987 A2 * | 2/2001 | ............. G06Q 30/02 |

OTHER PUBLICATIONS

Schmiedel, Heiko; Kostova, Gergana; Ruttenberg, Wiebe, The Social and Private Costs of Retail Payment Instruments, Sep. 2012, European Central Bank, Occasional Paper Series, No. 137 (Year: 2012).*

*Primary Examiner* — Brian M Epstein
*Assistant Examiner* — Kristin E Gavin
(74) *Attorney, Agent, or Firm* — Foley & Lardner LLP (57) ABSTRACT

Systems and methods of determining real-time available capacity of a merchant are provided. A plurality of financial transactions involving the merchant can be received during a current time period. A current payment velocity of the financial transactions involving the merchant during the current time period can be determined. The current payment velocity can be compared with a baseline payment velocity associated with financial transactions involving the merchant during a corresponding historical time period. An available capacity of the merchant can be determined, based on a difference between the current payment velocity and the baseline payment velocity.

8 Claims, 4 Drawing Sheets

(56) References Cited

U.S. PATENT DOCUMENTS

| | | |
|---|---|---|
| 9,331,994 B2 | 5/2016 | Grigg et al. |
| 9,373,112 B1 | 6/2016 | Henderson et al. |
| 2011/0208563 A1* | 8/2011 | Barnas ............... G06Q 30/0206 |
| | | 705/7.35 |
| 2011/0264500 A1 | 10/2011 | Bouthillier et al. |
| 2012/0060214 A1 | 3/2012 | Nahari |
| 2013/0090959 A1* | 4/2013 | Kvamme ............... G06Q 10/02 |
| | | 705/5 |
| 2015/0310434 A1 | 10/2015 | Cheung |
| 2015/0356562 A1 | 12/2015 | Siddens et al. |
| 2017/0103374 A1* | 4/2017 | Bhattacharjee ........ G06Q 20/32 |
| 2017/0351981 A1* | 12/2017 | Senci ................. G06Q 30/0201 |

* cited by examiner

SYSTEMS AND METHODS FOR DETERMINING REAL TIME AVAILABLE CAPACITY OF A MERCHANT

CROSS-REFERENCE TO RELATED APPLICATION

This application claims priority to U.S. Provisional Patent Application No. 62/439,331 entitled "SYSTEMS AND METHODS FOR DETERMINING REAL-TIME AVAILABLE CAPACITY OF A MERCHANT," filed Dec. 27, 2016, and incorporated herein by reference in its entirety.

TECHNICAL FIELD

Embodiments of the present disclosure generally relate to assessing an available capacity of a merchant in real-time.

BACKGROUND

Merchants may have a fixed capacity for serving customers, for example based on an amount of physical space, product inventory, and staffing level available. However, the fixed capacity of a merchant often may not be compatible with customer demand. For example, during times of low demand, the merchant may have unused capacity that increases costs for the merchant without generating any corresponding increase in revenue. During times of high demand, the merchant may have to forgo sales as a result of having insufficient capacity to accommodate additional customers.

SUMMARY

One example embodiment relates to a computer-implemented method for determining real-time available capacity of a merchant. The method includes receiving, by an account management circuit, a plurality of financial transactions involving the merchant during a current time period. The method includes determining, by a payment velocity determination circuit, a current payment velocity of the financial transactions involving the merchant during the current time period. The method includes comparing, by a comparison circuit, the current payment velocity with a baseline payment velocity associated with financial transactions involving the merchant during a corresponding historical time period. The method includes determining, by a capacity determination circuit, an available capacity of the merchant, based on a difference between the current payment velocity and the baseline payment velocity.

In some arrangements, the method can include selecting, by the comparison circuit, the corresponding historical time period based on at least one of a month of the current time period, a day of the current time period, and an hour of the current time period. In some arrangements, the method can include receiving, by an occupancy determination circuit, occupancy information for the merchant during the current time period. Determining the available capacity of the merchant can further include determining, by the capacity determination circuit, the available capacity of the merchant based at least in part on the occupancy information.

In some arrangements, the method can include receiving, by the capacity determination circuit, information relating to a staffing availability of the merchant during the current time period. Determining the available capacity of the merchant can further include determining, by the capacity determination circuit, the available capacity of the merchant based at least in part on the information relating to the staffing availability. In some arrangements, the method can include determining, by a price determination circuit, an adjusted price of at least one product or service offered by the merchant, based on the available capacity.

In some arrangements, the method can include determining, by a customer identification circuit, a proximity of at least one user of a mobile computing device to the merchant during the current time period. The method also can include identifying, by the customer identification circuit, the user of the mobile device as a potential customer, based on the proximity of the user to the merchant.

In some arrangements, determining the adjusted price of the at least one product or service offered by the merchant can include determining a reduced price of the at least one product or service. The method can also include generating, by an advertisement circuit, an advertisement for the at least one product or service offered by the merchant. The advertisement can include an indication of the adjusted price of the at least one product or service. In some arrangements, the method can include transmitting, by the advertisement circuit, the advertisement to the mobile computing device of the user identified as the potential customer during the current time period.

In some arrangements, determining the adjusted price of the at least one product or service offered by the merchant can include determining an increased price of the at least one product or service. The method can also include generating, by an alert notification circuit, a surge pricing notification for the at least one product or service offered by the merchant. The surge pricing notification can include an indication of the adjusted price of the at least one product or service.

In some arrangements, the method can include transmitting, by the alert notification circuit, the surge pricing notification to a computing device of the merchant during the current time period.

Another example embodiment relates to a system for determining real-time available capacity of a merchant. The system can include an account management circuit configured to receive a plurality of financial transactions involving the merchant during a current time period. The system can include a payment velocity determination circuit configured to determine a current payment velocity of the financial transactions involving the merchant during the current time period. The system can include a comparison circuit configured to compare the current payment velocity with a baseline payment velocity associated with financial transactions involving the merchant during a corresponding historical time period. The system can include a capacity determination circuit configured to determine an available capacity of the merchant, based on a difference between the current payment velocity and the baseline payment velocity.

In some arrangements, the comparison circuit can be further configured to select the corresponding historical time period based on at least one of a month of the current time period, a day of the current time period, and an hour of the current time period. In some arrangements, the system can include an occupancy determination circuit configured to determine occupancy information for the merchant during the current time period. The capacity determination circuit can be further configured to determine the available capacity of the merchant based at least in part on the occupancy information.

In some arrangements, the capacity determination circuit can be further configured to receive information relating to a staffing availability of the merchant during the current time period. The capacity determination circuit also can be configured to determine the available capacity of the merchant based at least in part on the information relating to the staffing availability.

In some arrangements, the system can include a price determination circuit configured to determine an adjusted price of at least one product or service offered by the merchant, based on the available capacity. In some arrangements, the system can include a customer identification circuit configured to determine a proximity of at least one user of a mobile computing device to the merchant during the current time period, and to identify the user of the mobile device as a potential customer, based on the proximity of the user to the merchant.

In some arrangements, the system can include an advertisement circuit configured to generate an advertisement for the at least one product or service offered by the merchant, responsive to the price determination circuit determining that the adjusted price of the at least one product or service offered by the merchant is a reduced price. In some arrangements, the advertisement circuit can be further configured to transmit the advertisement to the mobile computing device of the user identified as the potential customer during the current time period. In some arrangements, the system can include an alert notification circuit configured to generate a surge pricing notification for the at least one product or service offered by the merchant, responsive to the price determination circuit determining that the adjusted price of the at least one product or service offered by the merchant is an increased price. In some arrangements, the alert notification circuit can be further configured to transmit the surge pricing notification to a computing device of the merchant during the current time period.

These and other aspects and arrangements are discussed in detail below. The foregoing information and the following detailed description include illustrative examples of various aspects and arrangements, and provide an overview or framework for understanding the nature and character of the claimed aspects and arrangements. The drawings provide illustration and a further understanding of the various aspects and arrangements, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

The present disclosure is generally directed to systems and methods for determining real-time available capacity of a merchant and adjusting the price of goods or services based on the real-time available capacity of the merchant. Merchants often have a fixed capacity for serving customers (e.g., supply) that is mismatched with demand for the merchant's goods or services during certain time periods. Available capacity of a merchant can be based on factors including an amount of physical space, product inventory, and staffing level available. In some instances, it may be difficult for a merchant to adjust some or all of these parameters quickly. However, demand for a merchant's goods or services may change relatively quickly, and may be difficult for the merchant to accurately predict in advance. As a result, both the merchant and the merchant's potential customers can experience deadweight economic loss during times of mismatched supply (i.e., available capacity of the merchant) and demand. For example, when demand is relatively low, the merchant may have unused capacity that increases costs for the merchant without generating any corresponding increase in revenue. When demand is relatively high, the merchant may have to forgo sales (and interested consumers may have to forgo consumption of the merchant's products or services) as a result of the merchant having insufficient available capacity.

Because a merchant's available capacity to serve customers may remain relatively static over short time periods, the merchant may instead attempt to address a mismatch in supply and demand in other ways. For example, the merchant may adjust its prices to account for a suddenly increased demand level, or may advertise its goods and services to potential customers in response to a suddenly decreased demand level. Such actions must be taken quickly in order to coincide with a rapidly changing demand level. However, it can be difficult for a merchant to determine that demand is changing (i.e., increasing or decreasing) soon enough for the merchant to act.

To address rapidly and/or unexpectedly changing demand levels, financial transaction data can be used to provide an estimate of the real-time available capacity of a merchant. Financial transaction data can include information relating to transactions conducted between the merchant and various customers during a given time period. A payment velocity for the time period can be determined based on the financial transaction data. Payment velocity may refer to a number of payment transactions processed by the merchant during a unit of time, which in some instances may be the duration of the time period being analyzed. The real-time available capacity of the merchant can be assessed by comparing the current payment velocity to a different payment velocity metric. For example, the payment velocity for the current time period can be compared to a payment velocity measured during a corresponding historical time period. If the current payment velocity exceeds the historical payment velocity, it can be determined that the merchant is experiencing more business activity than usual, and therefore that the merchant has relatively low available capacity. On the other hand, if the current payment velocity is lower than the historical payment velocity, it can be determined that the merchant is experiencing less business activity than usual, and therefore that the merchant has relatively high available capacity.

In another example, the payment velocity for the current time period can be compared to a payment velocity corresponding to a maximum capacity of the merchant. If the current payment velocity is below the payment velocity corresponding to the merchant's maximum capacity, it can be determined that the merchant is operating below its maximum capacity. In some instances, such information can allow an action to be taken to cause the demand for the merchant's goods or services to be adjusted based on the available capacity. For example, during a period of high available capacity, an advertisement may be sent to potential customers in an attempt to increase demand so that the excess capacity of the merchant can be used. During a period of low available capacity, the merchant may increase its prices to account for the higher than usual demand level. Thus, financial transaction data can be used to determine the available capacity of a merchant in real time, and to take a corresponding action based on the determined available capacity. This disclosure addresses the technical problems associated with processing and analyzing financial transaction data to provide an estimate of a real-time available capacity of a merchant.

Figure 1:
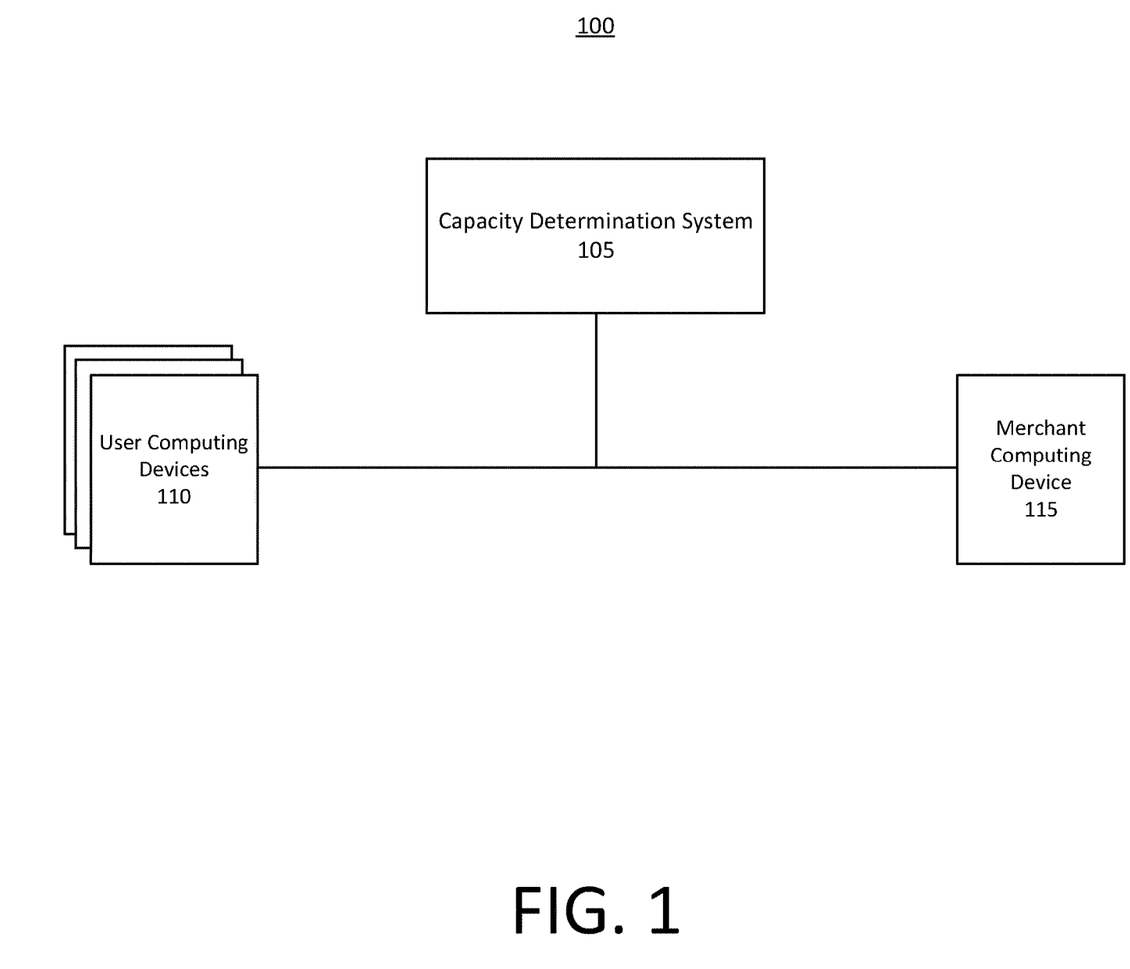
FIG. 1 is a block diagram of a computing environment for determining real-time available capacity of a merchant, according to an example embodiment.

FIG. 1 is a block diagram of a computing environment 100 for determining real-time available capacity of a merchant, according to an illustrative implementation. The environment 100 includes a capacity determination system 105, a plurality of user computing devices 110, and a merchant computing device 115. The user computing devices 110 and the merchant computing device 115 are communicatively coupled to one another, and to the capacity determination system 105. The computing environment 100 of FIG. 1 is used to determine an available capacity of a merchant, such as a merchant associated with the merchant computing device 115. In some arrangements, the determination of the merchant's capacity is performed in real-time. The determination allows the merchant (or the capacity determination system 105) to take an action (e.g., providing an advertisement to potential customers, increasing prices, etc.) to account for changes in the available capacity of the merchant that may occur rapidly.

Figure 2:
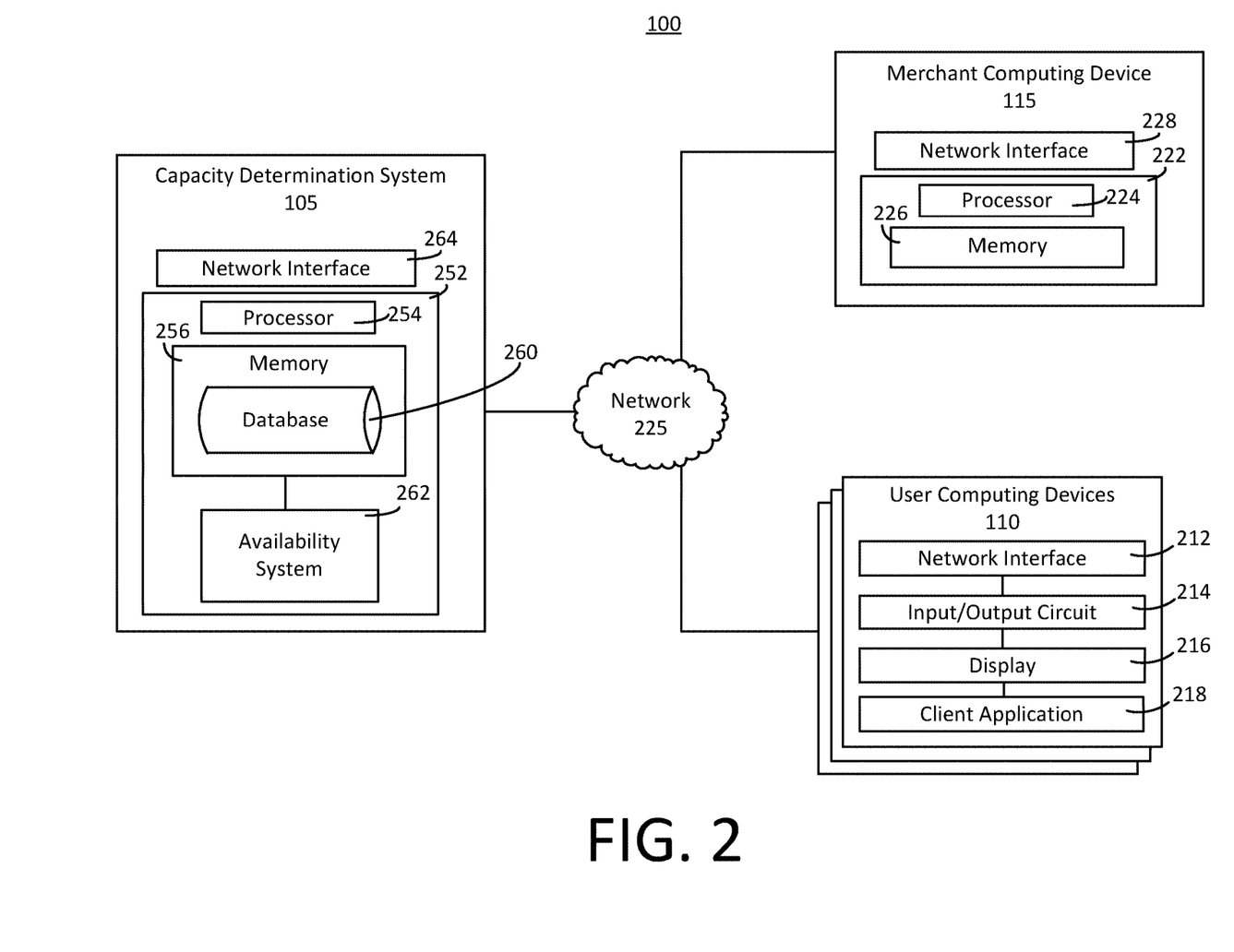
FIG. 2 is a detailed schematic diagram of the computing environment of FIG. 1.

Referring now to FIG. 2, a detailed schematic diagram of the computing environment 100 of FIG. 1 is shown. The components of the environment 100, such as the capacity determination system 105, the user computing devices 110, and the merchant computing device 115, are communicatively coupled to one another via a network 225. In some arrangements, the network 225 includes any of the Internet, a private network, a wide area network (WAN), or a combination thereof. It should be understood that, although only a single network 225 is shown in FIG. 2 for illustrative purposes, in some arrangements the components of the environment 100 are interconnected to one another via two or more interconnected computer networks that may be combined to implement the network 225.

The capacity determination system 105 is configured to determine a real-time available capacity of the merchant associated with the merchant computing device 115. In some arrangements, the merchant is a business of any kind. For example, in some arrangements the merchant is the owner or operator of a restaurant, a movie theater, a service provider, a retailer, etc. As described in further detail below, the available capacity of the merchant is based at least in part on a transaction velocity associated with the merchant.

The available capacity of the merchant is any metric related to the maximum output of the merchant during a particular time period. For example, in some arrangements, the available capacity is a metric indicating a total number of customers the merchant is capable of serving either simultaneously or during the time period. In some other arrangements, the available capacity is the total number or amount of products that the merchant is capable of providing to customers during the time period. In still other arrangements, the available capacity is a total number of financial transactions that the merchant is capable of processing during the time period. The available capacity is determined by the capacity determination system 105 based on information it receives form the user computing devices 110 and the merchant computing devices 115.

In some arrangements, the user computing devices 110 are computing devices associated with individual users or small groups of users (e.g., a family), where each user is an individual. Each of the user computing devices 110 may be any type or form of computing device owned by, operated by, accessed by, or otherwise associated with a respective user. In some arrangements, each of the user computing devices 110 is at least one of a server, a desktop computer, or a laptop computer. In some other arrangements, each of the user computing devices 110 is a mobile computing device such as a tablet computing device, or a handheld computing device, such as a smartphone.

Each user computing device 110 includes a network interface 212, an input/output circuit 214, a display 216, and a client application 218. The network interface 212 of the user computing device 110 is adapted for and configured to establish a communication session via the network 225 with the capacity determination system 105 or the merchant computing devices 115. Accordingly, the network interface 212 includes any of a cellular transceiver (Code Division Multiple Access (CDMA), Global System for Mobile Communications (GSM), Long-Term Evolution (LTE), etc.), a wireless network transceiver (e.g., 802.11X, ZigBee, Bluetooth, etc.), or a combination thereof (e.g., both a cellular transceiver and a Bluetooth transceiver).

The display 216 is used to present account information, transaction information, and the like. In this regard, the display 216 is communicably and operatively coupled to the input/output circuit 214 to provide a user interface for receiving and displaying information on the user computing device 110. The input/output circuit 214 is structured to receive and provide communication(s) to a user of the user computing device 110. In this regard, the input/output circuit 214 is structured to exchange data, communications, instructions, etc., with an input/output component of the user computing device 110. Accordingly, in one embodiment, the input/output circuit 214 includes an input/output device such as a display device, a touchscreen, a keyboard, and a microphone. In another embodiment, the input/output circuit 214 may include communication circuitry for facilitating the exchange of data, values, messages, and the like between an input/output device and the components of the user computing device 110. In yet another embodiment, the input/output circuit 214 may include machine-readable media for facilitating the exchange of information between the input/output device and the components of the user computing device 110. In still another embodiment, the input/output circuit 214 may include any combination of hardware components (e.g., a touchscreen), communication circuitry, and machine-readable media.

The client application 218 is communicably coupled to the capacity determination system 105 and the merchant computing devices 115 via the network 125, and may be structured to permit completion of financial transactions via the client application 218. In this regard, the client application 218 may provide displays indicative of current account balances, pending transactions, profile information (e.g., contact information), and the like. Further, in some arrangements, the client application 218 may also permit payments to and/or from the user to a designated recipient (e.g., a merchant associated with the merchant computing device 115). In still other arrangements, the client application 218 is configured to display notifications to the user relating to prices, products, or services offered by the merchant. For example, the client application 218 can display an advertisement related to a featured product or promotional pricing of the merchant's goods or services. A notification can be received at the user computing device 110 (e.g., via the network interface 212) from either the capacity determination system 105 or the merchant computing device 115. Such functionality allows the user to be notified of special prices that may be offered by the merchant as a result of generally lower demand for the goods and services offered by the merchant. In some arrangements, the client application 218 is a web browser application. For example, the client application 218 can allow the user to access an online banking area of a website maintained by a financial institution. In some implementations, such a website can be maintained by the capacity determination system 105.

The merchant computing device 115 corresponds to a computing device owned by, operated by, accessed by, or otherwise associated with a merchant. As described above, a merchant may be a business or other organization that offers goods and/or services for sale to individuals (e.g., users of the user computing devices 110). Like the user computing devices 110, the merchant computing device 115 also can be implemented as any type and form of computing device, including a server, a desktop computer, a laptop computer, a tablet computing device, or a smartphone. In still other arrangements, the merchant computing device 115 is an automated teller machine (ATM) or other currency dispensing device, or a point-of-sale computing device. In such arrangements, the point-of-sale computing device may include a card reader/writer configured to process financial transactions via the use of a credit card, a debit card, a stored value card, a chip reader/writer configured to process financial transactions via the use of a near-field communication (NFC)-enabled device.

The merchant computing device 115 includes a processing circuit 222 having a processor 224 and a memory 226. The processor 224 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 226 (e.g., RAM, NVRAM, ROM, Flash Memory, hard disk storage, etc.) may store data and/or computer code for facilitating the various processes described herein. Moreover, the one or more memory devices 226 may be or include tangible, non-transient volatile memory or non-volatile memory. Accordingly, the one or more memory devices 226 may include database components, object code components, script components, or any other type of information structure for supporting the various activities and information structures described herein.

The merchant computing device 115 further includes a network interface 228. The network interface 228 is adapted for and configured to establish a communication session via the network 225 with the capacity determination system 105 and the user computing devices 110. Accordingly, the network interface 228 includes any of a cellular transceiver (CDMA, GSM, LTE, etc.), a wireless network transceiver (e.g., 802.11X, ZigBee, Bluetooth, etc.), or a combination thereof (e.g., both a cellular transceiver and a Bluetooth transceiver).

The capacity determination system 105 facilitates calculation of an available capacity of the merchant associated with the merchant computing device 115 in real time. As shown, the capacity determination system 105 includes a processing circuit 252 having a processor 254 and a memory 256. The processor 254 may be implemented as a general-purpose processor, an ASIC, one or more FPGAs, a DSP, a group of processing components, or other suitable electronic processing components. The one or more memory devices 256 (e.g., RAM, NVRAM, ROM, Flash Memory, hard disk storage, etc.) may store data and/or computer code for facilitating the various processes described herein. Moreover, the one or more memory devices 256 may be or include tangible, non-transient volatile memory or non-volatile memory. Accordingly, the one or more memory devices 256 may include database components such as the database 260, object code components, script components, or any other type of information structure for supporting the various activities and information structures described herein.

The capacity determination system 105 further includes a network interface 264, which is used to establish connections with other components of the environment 100 by way of the network 225. The network interface 264 includes program logic that facilitates connection of the capacity determination system 105 to the network 225. The network interface 264 supports communication between the capacity determination system 105 and other systems, such as the user computing devices 110 and the merchant computing devices 115. For example, in some arrangements the network interface 264 includes at least one of a cellular modem, a Bluetooth transceiver, a Bluetooth beacon, a radio-frequency identification (RFID) transceiver, and an NFC transmitter. In some arrangements, the network interface 264 includes the hardware and machine-readable media sufficient to support communication over multiple channels of data communication. Further, in some arrangements, the network interface 264 includes cryptography capabilities to establish a secure or relatively secure communication session with user computing devices 110 and the merchant computing device 115. In this regard, financial data (or other types of data) may be encrypted and transmitted to prevent or substantially prevent the threat of hacking.

The capacity determination system 105 further includes a database 260. The database 260 is configured to hold, store, categorize, and otherwise serve as a repository for information associated with an available capacity of the merchant. For example, the database 260 may store information relevant to the capacity of the merchant, such as transaction history involving the merchant. The database 260 is structured to selectively provide access to information relating to the available capacity of the merchant. In this regard, as discussed further herein, the database 260 is communicably and operatively coupled to an availability system 262 to provide access to such information. Although shown as being part of the memory 256 in FIG. 2, the database 260 may be separate from the memory 256 and a stand-alone component of the capacity determination system 105. The availability system 262 is configured to determine an available capacity of the merchant in real time, and to take various actions based on the determined real-time capacity of the merchant, such as generating advertisements for the merchant's goods and services, or alerting the merchant to a potential surge in demand. The availability system 262 is described further below in connection with FIG. 3.

The capacity determination system 105 may be maintained by an organization, such as a financial institution, that also has access to financial accounts associated with at least some of the users of the user computing devices 110 and/or the merchant associated with the merchant computing device 115. In some arrangements, the financial institution processes payment transactions (e.g., credit card transaction, debit card transactions, mobile wallet transactions, gift card transactions, and the like). For example, the capacity determination system 105 may be maintained by a bank that maintains the accounts of users of the user computing devices 110 and/or processes transactions between customers and the merchant associated with the merchant computing device 115. In one example, a user computing device 110 includes an NFC-enabled smartphone, and a merchant computing device 115 includes a point-of-sale device. In this example, a user makes a purchase from the merchant using the smartphone. Communications between the user computing device 110 and the merchant computing device 115 that result from the transaction may traverse the network 225. In some arrangements, at least some such communications also are received by the capacity determination system 105 (e.g., via the network interface 264). In some other arrangements, the capacity determination system 105 may receive an indication that a financial transaction has taken place between a user and the merchant, for example if the user paid for the purchase with funds stored in an account to which the capacity determination system 105 has access. The capacity determination system 105 uses such financial transaction information, along with information relating to additional transactions (e.g., between users of other user computing devices 110 and the merchant), to generate, determine the real-time available capacity of the merchant, as discussed further below.

Figure 3:
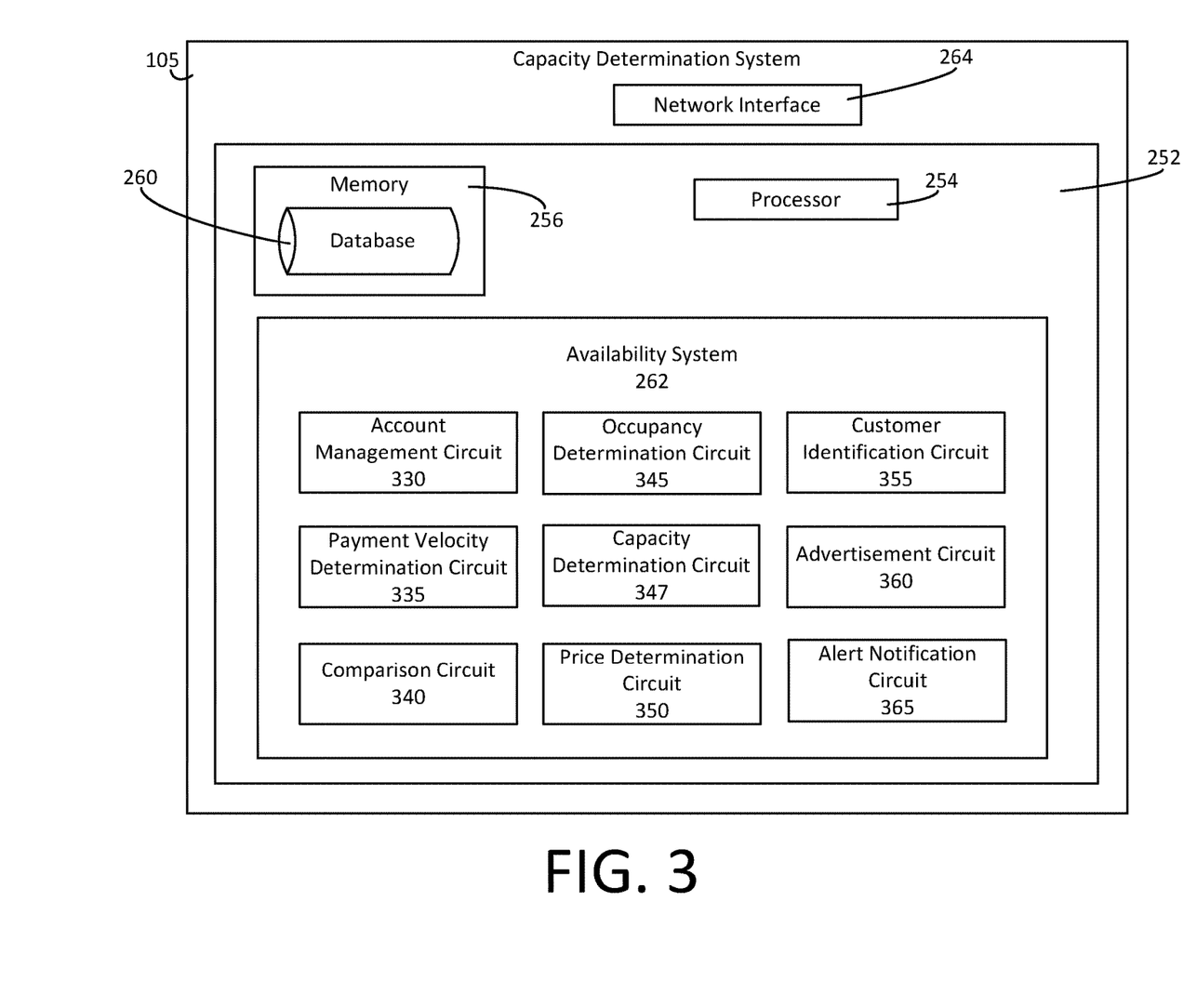
FIG. 3 is detailed schematic diagram of a capacity determination system included in the environment of FIG. 2, according to an example embodiment.

Referring now to FIG. 3, a detailed schematic diagram of the availability system 262 and part of the capacity determination system 105 included in the environment 100 of FIG. 2 is shown, according to an illustrative implementation. The availability system 262 is shown to include an account management circuit 330, a payment velocity determination circuit 335, a comparison circuit 340, an occupancy determination circuit 345, a capacity determination circuit 343, a price determination circuit 350, a customer identification circuit 355, an advertisement circuit 360, and an alert notification circuit 365. It should be understood that other arrangements of the availability system 262 may include more or fewer circuits without departing from the spirit and scope of this disclosure. Furthermore, in some arrangements, the functionality of one or more circuits may be combined into a single circuit and/or into circuits separate from the processing circuit 252. Within the capacity determination system 105, the availability system 262 is operably and communicatively coupled to the database 260 and the processor 254. FIG. 3 is described with reference to FIGS. 1 and 2 below.

The account management circuit 330 is configured to receive information corresponding to a plurality of financial transactions involving the merchant associated with the merchant computing device 115. In some arrangements, the information corresponding to such financial transactions is stored in the database 260. The information includes a time at which the transaction was completed, a location at which the transaction was completed, an identity of one or more counterparties to the transaction, a dollar amount associated with the transaction, and a product or service associated with the transaction. The account management circuit 330 is configured to retrieve the information from the database 260. In some arrangements, the database 260 stores a table having entries corresponding to various financial transactions. The account management circuit 330 is configured to query the database 260 for all of the financial transactions to whom the merchant is a counterparty, and to receive the results returned by the database 260 in response to the query. In some arrangements, the account management circuit 330 receives information relating only to those transactions involving the merchant that have occurred during a current time period. The current time period may be any recent time period up to and including a present time. For example, in some arrangements the current time period is a duration of time including the previous five minutes, the previous ten minutes, the previous 20 minutes, the previous 30 minutes, the previous 45 minutes, the previous hour, the previous two hours, or the previous three hours. To this end, the account management circuit 330 is configured to query the database 260 to retrieve information relating only to those financial transactions involving the merchant during the current time period, and does not receive information relating to transactions that occurred outside of the current time period.

In some arrangements, the account management circuit 330 is further configured to process transactions rather than to merely receive information relating to previously processed transactions. For example, a user of a user computing device 110 may be the holder of a credit card account whose information is stored in the database 260. When the user attempts to purchase an item from the merchant, the account management circuit 330 receives a notification of the requested transaction via the network 225. The account management circuit 330 retrieves corresponding account information from the database 260. In some arrangements, the account management circuit 330 determines whether the account has sufficient credit or funds available to complete the requested transaction and, if so, authorizes the financial transaction. In some arrangements, the account management circuit 330 also stores a record of the financial transaction in the database 260 for later retrieval.

The payment velocity determination circuit 335 is configured to determine a current payment velocity of the financial transactions involving the merchant during the current time period. In some arrangements, the payment velocity determination circuit 335 makes this determination based on the transaction information received by the account management circuit 330. Thus, the payment velocity determination circuit 335 is configured to communicate with the account management circuit 330 such that the transaction information for the current time period can be provided to the payment velocity determination circuit 335. In some arrangements, the payment velocity determination circuit 335 requests the transaction information for the current time period from the account management circuit 330. In some other arrangements, the account management circuit 330 is configured to send the transaction information for the current time period to the payment velocity determination circuit 335 without first receiving a request for the information.

The current payment velocity is a metric relating to the total amount of transactions processed by the merchant in a given period of time. The period of time may coincide with, or may overlap in part with, the current time period. In some arrangements, the payment velocity determination circuit 335 determines the current payment velocity based on a total number of transactions processed by the merchant during the current time period. Thus the payment velocity may be measured as a number of transactions processed per unit of time. In some other arrangements, the payment velocity determination circuit 335 determines the payment velocity based on a total dollar value of transactions processed during the current time period. For example, in some arrangements the payment velocity determination circuit 335 determines the current payment velocity as the total value of all transactions processed during the current time period. In some arrangements, the payment velocity determination circuit 335 only has access to a portion of the financial transactions processed by the merchant. For example, the merchant may process some cash transactions for which information is not available to the payment velocity determination circuit 335. In such arrangements, the payment velocity determination circuit 335 is configured to compensate for the lack of complete financial transaction data. For example, the payment velocity determination circuit 335 can be configured to multiple the payment velocity determined from the incomplete data by a factor selected to compensate for cash transactions and/or other transactions that may not be captured in the available financial transaction data. In some implementations, such a factor can be provided by the merchant. The payment velocity determination circuit 330 is configured to store the current payment velocity in the database 260. In some arrangements, the payment velocity determination circuit 330 stores a current payment velocity in the database 260 on a continuous or periodic basis.

The comparison circuit 340 is configured to compare the current payment velocity with another comparison metric. For example, in some arrangements, the comparison circuit 340 is configured to compare the current payment velocity with a payment velocity of another time period. In one example, the comparison circuit 340 selects a time period for comparison to the current time period. The selection can be based on various characteristics of the current time period. For example, in some arrangements the comparison circuit 340 selects a time period for comparison based on a day of the current time period, a week of the current time period, or a time (e.g., a start time) of the current period. In some arrangements, the comparison circuit 340 selects the comparison time period to correspond to the current time period. Thus, the comparison circuit 340 can select the comparison time period to be a time period from the same day of the week as the current time period, the same month as the current time period, or the same hour (e.g., beginning at the same hour on a different day) as the current time period. Such a time period is sometimes referred to as a baseline time period.

The comparison circuit 340 determines a payment velocity associated with the baseline time period. In some arrangements, as described above, the payment velocity determination circuit 335 stores payment velocity information for various time periods in the database 260. After determining the baseline time period, the comparison circuit 340 queries the database 260 for the payment velocity of the merchant associated with the baseline time period, and receives the resulting baseline payment velocity from the database 260. The comparison circuit 340 also retrieves the current payment velocity, for example from either the payment velocity determination circuit 335 or from the database 260. The comparison circuit 340 then compares current payment velocity with the baseline payment velocity by determining a difference between the current payment velocity and the baseline payment velocity. In some arrangements, the comparison circuit 340 determines a percentage difference between the current payment velocity and the baseline payment velocity. In some other arrangements, the comparison circuit 340 determines an absolute difference between the current payment velocity and the baseline payment velocity (e.g., a difference measured in the same units as both the current payment velocity and the baseline payment velocity).

In another example, the comparison metric is a maximum payment velocity, and therefore the comparison circuit 340 instead compares the current payment velocity to the maximum payment velocity. The maximum payment velocity is measured in the same units as the current payment velocity, and represents the maximum velocity of payments that can be processed by the merchant. The comparison circuit 340 calculates the difference between the current payment velocity and the maximum payment velocity in a manner similar to that described above. Thus, in some arrangements, the comparison circuit 340 determines a percentage difference between the current payment velocity and the maximum payment velocity. In some other arrangements, the comparison circuit 340 determines an absolute difference between the current payment velocity and the maximum payment velocity.

The occupancy determination circuit 345 is configured to determine an occupancy level of the merchant. The occupancy metric is a metric relating to a number of customers being served by the merchant during the current time period. Thus, in some arrangements, for a merchant corresponding to a restaurant, the occupancy level is measured as the number of tables occupied by customers curing the current time period. In other arrangements in which the merchant corresponds to a movie theater, the occupancy level is measured as the number of seats occupied by customers during the current time period. In some arrangements, the occupancy determination circuit 345 is configured to determine an occupancy based in part on information received from the user computing devices 110. For example, the occupancy determination circuit 345 can receive location information from one or more of the user computing devices 110, and can therefore determine that the user computing devices 110 are located at the merchant during the current time period. Determining that a larger number of user computing devices 110 are located at the merchant can result in the occupancy determination circuit 345 determining a higher occupancy level for the merchant.

In some arrangements, the occupancy determination circuit 345 determines the occupancy level by requesting such information directly from the merchant. For example, the occupancy determination circuit 345 transmits a request for occupancy information to the merchant computing device 115 (e.g., via the network interface 264), and receives a response from the merchant computing device 115 including the requested occupancy information. In some arrangements, the merchant computing device 115 implements management software (e.g., a restaurant management system) that stores and updates occupancy information. The merchant computing device 115 transmits such information to the occupancy determination circuit 345. In some other arrangements, current occupancy information is stored in the database 260, and the occupancy determination circuit 345 retrieves the occupancy information from the database 260.

The capacity determination circuit 347 is configured to determine an available capacity of the merchant in real time. In some arrangements, the capacity determination circuit 347 determines the merchant's available capacity based on information received from one or both of the comparison circuit 340, and the occupancy determination circuit 345. For example, the capacity determination circuit 347 determines the available capacity of the merchant based on the difference between the current payment velocity and the comparison metric used by the comparison circuit 340. In some arrangements, the capacity determination circuit 347 determines that the merchant has excess available capacity based on a determination that the current payment velocity is lower than the comparison metric (e.g., the baseline payment velocity or the maximum payment velocity). Similarly, the capacity determination circuit 347 determines that the merchant does not have available capacity based on a determination that the current payment velocity is equal to or greater than the comparison metric. In some arrangements, the capacity determination circuit 347 is further configured to determine the available capacity of the merchant based on a degree of difference between the current payment velocity and the comparison metric. For example, if the current payment velocity is much lower than comparison metric (e.g., more than 30% lower, more than 50% lower, or more than 75% lower), the capacity determination circuit 347 determines that the merchant has a large amount of available capacity. On the other hand, in instances in which the current payment velocity is lower than but close to the comparison metric (e.g., less than 30% lower, less than 15% lower, less than 10% lower, or less than 5% lower), the capacity determination circuit 347 determines that the merchant does not have a large amount of available capacity.

In some arrangements, the capacity determination circuit 347 uses other information to determine the available capacity of the merchant. For example, the capacity determination circuit 347 receives occupancy information from the occupancy determination circuit 345. The occupancy information is combined with the comparison information by the capacity determination circuit 347. In one example, if the information received from the comparison circuit indicates that the merchant has a large amount of available capacity but the occupancy information indicates that the merchant is relatively full, the capacity determination circuit 347 determines that the merchant does not have a large amount of available capacity despite the comparison information indicating such. Thus, in some arrangements the occupancy information is used to bolster the capacity determination made by the capacity determination circuit 347.

In some arrangements, the capacity determination circuit 347 uses other information received from the merchant to determine the available capacity of the merchant. For example, in some instances a merchant may be understaffed and therefore unable to serve its usual volume of customers. Thus, the capacity determination circuit 347 receives information corresponding to a staffing level from the merchant (e.g., via the network interface 264). The capacity determination circuit 347 then adjusts the estimation of the merchant's available capacity based on the staffing level. For example, if the information received from the comparison circuit 340 and the occupancy determination circuit 345 indicate that the merchant is only operating at 75% of its full capacity (i.e., the merchant has 25% capacity available) but the staffing level indicates that the merchant is understaffed by 25%, the capacity determination circuit 347 determines that the merchant does not have a large amount of available capacity.

In some arrangements, the capacity determination circuit 347 is further configured to predict an available capacity for the merchant at a future time. The predication can be based on trends relating to the available capacity level of the merchant over time. For example, in some arrangements the capacity determination circuit 347 determines that the merchant has available capacity but that the available capacity of the merchant has been steadily decreasing during the current time period. As a result, the capacity determination circuit 347 determines that the merchant is likely to be over capacity in the future if the trend continues. In some arrangements, the capacity determination circuit 347 determines the time at which the merchant is likely to run out of available capacity. In some arrangements, the capacity determination circuit 347 is configured to make a prediction based on other information as well, which may be unrelated to transactional information involving the merchant. In some arrangements, the capacity determination circuit 347 receives location information from the user computing devices 110. If the location information indicates that a large number of computing devices are positioned near the location of the merchant, the capacity determination circuit 347 determines that the demand for the merchant's products is likely to increase in the future as a result of the large number of user computing devices 110 (and therefore users themselves) in the vicinity of the merchant. Similarly, the capacity determination circuit 347 may make such a determination based on the available capacities of other businesses who are geographically close to the merchant. The capacity determination circuit 347 determines an available capacity of the other businesses near the merchant using the techniques described above. If the other businesses are busier than usual (i.e., have lower available capacity than usual), then the capacity determination circuit 347 determines that there are many potential customers in the vicinity of the merchant and that the merchant is likely to experience a surge in demand (and a corresponding decrease in available capacity) soon.

The price determination circuit 350 is configured to determine an adjusted price for the merchant's goods and services. The adjusted price is based on the merchant's available capacity. In some arrangements, the price determination circuit 350 is configured to determine adjusted pricing information as a percentage of a baseline price. The adjusted price determined by the price determination circuit 350 allows the merchant to mitigate the adverse effects of significantly increased or reduced available capacity. For example, in some arrangements the capacity determination circuit 347 determines that the merchant has a large percentage of available capacity. As a result, the price determination circuit 350 determines a relatively lower price for the merchant's goods and services. The price determination circuit 350 selects the lower price to attempt to increase demand for the merchant's services so that the merchant's available capacity can be put to use. In contrast, when the capacity determination circuit 347 determines that the merchant has no available capacity, the price determination circuit 350 determines a relatively higher price for the merchant's goods and services. A lack of available capacity at the merchant indicates strong demand for the merchant's goods and services, and therefore the increased price determined by the price determination circuit 350 allow the merchant to increase revenue while its available capacity is low.

In some arrangements, the price determination circuit 350 also determines prices for the merchant's goods and services based on other metrics. In some arrangements, the price determination circuit 350 takes into account the price elasticity of demand for the merchant's goods and services. For example, if the demand for the merchant's goods and services is relatively inelastic, the price determination circuit 350 determines relatively larger price increases during periods of low available capacity, because large price increases are not likely to result in significantly diminished demand levels if demand is relatively inelastic. However, if the demand for the merchant's goods and services is relatively elastic, the price determination circuit 350 determines relatively smaller price increases during periods of low available capacity, because large price increases may cause demand levels to be reduced substantially if demand is relatively elastic.

The customer identification circuit 355 is configured to identify potential customers for the merchant. In some arrangements, the customer identification circuit 355 identifies customers based on their transaction history. As described above, in some arrangements the capacity determination system 105 is maintained by a financial institution, and the database 260 stores account information including transaction history for various users of the user computing devices 110. The customer identification circuit 355 uses the transaction information to identify potential customers for the merchant. In one example, the customer identification circuit 355 identifies potential customers as those who have conducted transactions with the merchant previously. In another example, the customer identification circuit 355 identifies potential customers as those who have conducted transactions with businesses similar to the merchant (e.g., businesses who sell goods or services similar to those sold by the merchant. In some arrangements, the customer identification circuit 355 also uses geographical information to identify potential customers. For example, a user of a user computing device 110 that is physically positioned near the merchant's location can be identified by the customer identification circuit 355 as a potential customer of the merchant based on the proximity of the user computing device 110 to the merchant's location.

The advertisement circuit 360 is configured to generate advertisements for the merchant's goods or services. The advertisements are generated to increase demand for the merchant's goods and services during times when the merchant has a large amount of available capacity. Thus, in one example, the price determination circuit 350 determines a reduced price for the goods or services offered by the merchant. As a result, the advertisement circuit 360 generates an advertisement including an indication of the reduced price in order to promote the merchant's goods and services. In some arrangements, the advertisement circuit 360 transmits the advertisement to the user computing devices 110 of one or more users identified as potential customers of the merchant by the customer identification circuit 355. The advertisement can be formatted in a variety of ways. For example, in some arrangements the advertisement circuit 360 generates an advertisement formatted as a text message. In some other arrangements, the advertisement circuit 360 generates the advertisement as an email or as a push notification associated with this client application 218 that executes on the user computing device 110. After being received by the user computing device 110 of the potential customer, the advertisement is displayed, for example, via the display 216 of the user computing device 110.

The alert notification circuit 365 is configured to generate a surge pricing notification for the merchant. The surge pricing notification alerts the merchant that prices should be increased during a time period in which the merchant does not have available capacity as a result of high demand. Thus, in one example, the price determination circuit 350 determines an increased price for the goods or services offered by the merchant. As a result, the alert notification circuit 365 generates a surge pricing notification for the merchant. The surge pricing notification includes an indication of the increased price of at least one product or service offered by the merchant as determined by the price determination circuit 350. In some arrangements, the alert notification circuit 365 transmits the surge pricing notification to the merchant computing device 115. The surge pricing notification can be formatted in a variety of ways. For example, in some arrangements the alert notification circuit 365 generates a surge pricing notification formatted as a text message. In some other arrangements, the alert notification circuit 365 generates the surge pricing notification as an email or as a web page that is displayed on the merchant computing device 115. The merchant can then adjust its prices accordingly.

Figure 4:
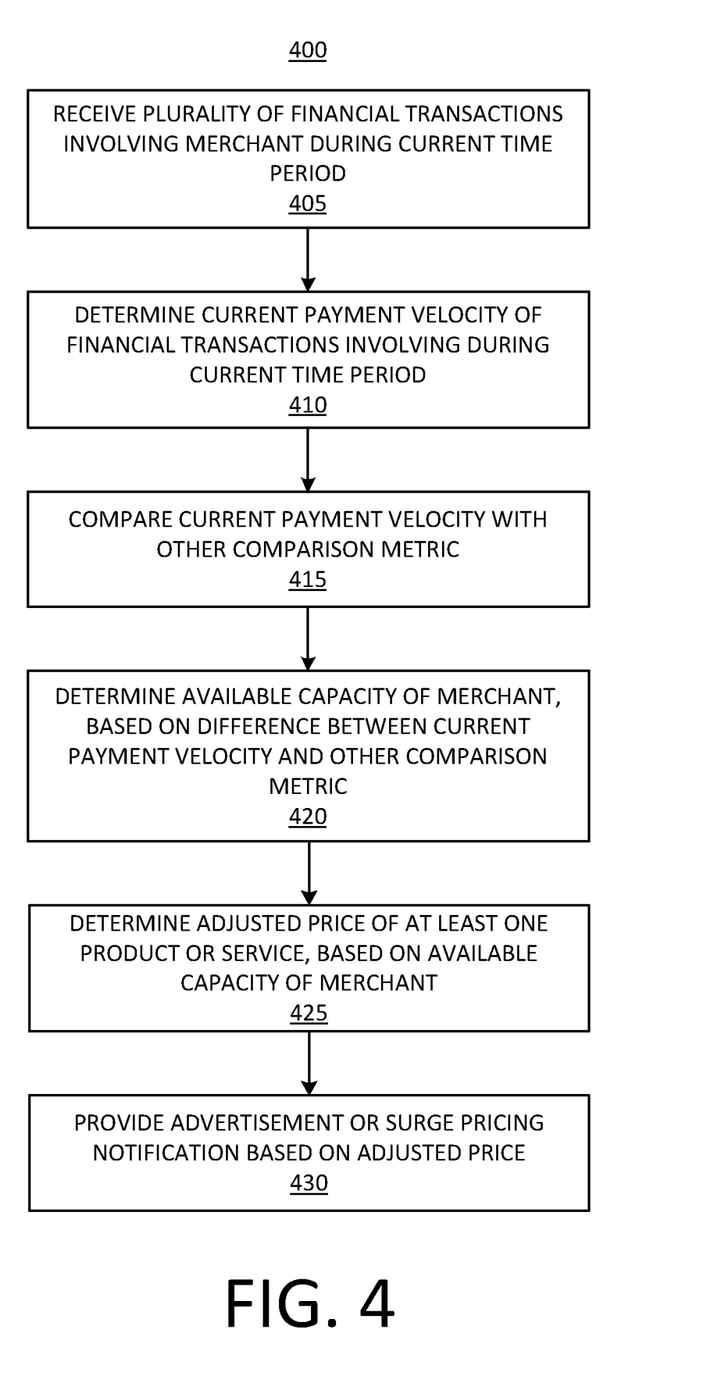
FIG. 4 is a flowchart illustrating an example method for determining real-time available capacity of a merchant, according to an example embodiment.

FIG. 4 is a flowchart illustrating an example method 400 for determining real-time available capacity of a merchant, according to an illustrative implementation. The method 400 is performed by the capacity determination system 105. Accordingly, in arrangements where the capacity determination system 105 is part of a financial institution, the method 400 may be performed by a financial institution computing system that includes the capacity determination system 105. Generally, through the method 400, the capacity determination system 105 determines the real-time available capacity of the merchant. The capacity determination system also determines an adjusted price for at least one product or service offered by the merchant based on the merchant's available capacity, and also provides an advertisement or a surge pricing notification including an indication of the adjusted price.

The method 400 begins when a plurality of financial transactions involving the merchant during a current time period are received at 405. In some arrangements, this is performed by an account management circuit such as the account management circuit 330 shown in FIG. 3. In some arrangements, additional information is received along with the financial transactions. For each financial transaction, the information includes a time at which the transaction was completed, a location at which the transaction was completed, an identity of one or more counterparties to the transaction, a dollar amount associated with the transaction, and a product or service associated with the transaction. In some arrangements, the financial transactions are retrieved from a database. The account management circuit can receive any number of transactions involving the merchant for the current time period.

A current payment velocity of the financial transactions involving the merchant during the current time period is determined at 410. In some arrangements, this step is performed by a payment velocity determination circuit such as the payment velocity determination circuit 335 shown in FIG. 3. The current payment velocity is any metric relating to the total amount of transactions processed by the merchant in a given period of time. In some arrangements, the time period may be the current time period for which the plurality of financial transactions were received. In some arrangements, the current payment velocity is determined based on a total number of transactions processed by the merchant during the current time period, and the payment velocity may be measured as a number of transactions processed per unit of time. In some other arrangements, the payment velocity is determined based on a total dollar value of transactions processed during the current time period. For example, in some arrangements the current payment velocity is determined as the total value of all transactions processed during the current time period. The current payment velocity can be stored in a memory device such as a database. In some arrangements, a payment velocity is determined for multiple other time periods as well, and all of the payment velocities are stored in the database.

The current payment velocity is compared with another comparison metric at 415. In some arrangements, this step is performed by a comparison circuit such as the comparison circuit 340 shown in FIG. 3. In some arrangements, the comparison metric with which the current payment velocity is compared is a payment velocity of another time period. The other time period is selected to have characteristics that match those of the current time period. For example, in some arrangements the time period for comparison is selected based on a day of the current time period, a week of the current time period, or a time (e.g., a start time) of the current period. The time period for comparison can be referred to as a baseline time period, and the payment velocity during the baseline time period can be referred to as the baseline payment velocity. In some arrangements, the current payment velocity is compared with the baseline payment velocity by determining a difference between the current payment velocity and the baseline payment velocity. In some arrangements, the difference is calculated as a percentage difference between the current payment velocity and the baseline payment velocity. In some other arrangements, the difference is calculated as an absolute difference between the current payment velocity and the baseline payment velocity.

In some arrangements, the comparison metric is a maximum payment velocity, rather than a baseline payment velocity from another time period. The maximum payment velocity is measured in the same units as the current payment velocity, and represents the maximum velocity of payments that can be processed by the merchant. The difference between the current payment velocity and the maximum payment velocity is calculated in a manner similar to that described above with respect to the difference between the current payment velocity and the baseline payment velocity. For example, in some arrangements, a percentage difference between the current payment velocity and the maximum payment velocity is determined. In some other arrangements, an absolute difference between the current payment velocity and the maximum payment velocity is determined.

An available capacity of the merchant is determined based on a difference between the current payment velocity and the selected comparison metric at 420. In some arrangements, this is performed by a capacity determination circuit such as the capacity determination circuit 347 shown in FIG. 3, which may determine the available capacity of the merchant in real time. In some arrangements, the capacity determination circuit determines that the merchant has excess available capacity based on a determination that the current payment velocity is lower than the comparison metric (e.g., the baseline payment velocity or the maximum payment velocity). Similarly, it can be determined that the merchant does not have available capacity based on a determination that the current payment velocity is equal to or greater than the comparison metric. In some arrangements, the available capacity of the merchant is determined based on a degree of difference between the current payment velocity and the comparison metric. For example, if the current payment velocity is significantly lower than comparison metric, it is determined that the merchant has a large amount of available capacity. However, if the current payment velocity is only slightly lower than the comparison metric, it is determined that the merchant does not have a large amount of available capacity.

In some arrangements, other information is used to determine the available capacity of the merchant. For example, in some arrangements occupancy information or staffing information is used in the determination of the merchant's available capacity. For example, in some instances the merchant may be understaffed and therefore its maximum capacity for the current time period may be reduced. To accommodate for such a scenario, the calculated available capacity of the merchant is adjusted downwards in some arrangements by an amount corresponding to the understaffing amount.

In some arrangements, an adjusted price of at least one product or service offered by the merchant is determined based on the available capacity of the merchant at 425. In some arrangements, this is performed by a price determination circuit such as the price determination circuit 350 shown in FIG. 3. In some arrangements, the adjusted price is determined as a percentage of a baseline price. The adjusted price allows the merchant to compensate for increased or reduced available capacity. For example, in some arrangements it is determined that the merchant has a large percentage of available capacity at 420. As a result, the price determination circuit determines a relatively lower price for the merchant's goods and services, which increases demand for the merchant's services so that the merchant's available capacity can be used. In contrast, when it is determined that the merchant has no available capacity, the price determination circuit determines a relatively higher price for the merchant's goods and services.

In some arrangements, the adjusted price is determined based in part on the price elasticity of demand for the merchant's goods and services. For example, if the demand for the merchant's goods and services is relatively inelastic, the baseline price is adjusted more drastically, while if the demand for the merchant's goods and services is relatively elastic, the baseline price is adjusted more conservatively.

An advertisement or a surge pricing alert is provided based on the adjusted price at 430. In some arrangements, this is performed by an advertisement circuit such as the advertisement circuit 360 shown in FIG. 3, or by an alert notification circuit such as the alert notification circuit 365 shown in FIG. 3. For example, if the adjusted price is lower than the baseline price (e.g., due to reduced demand at the merchant), an advertisement including an indication of the reduced price is generated and provided to one or more potential customers in order to promote the merchant's goods and services. Alternatively, if the adjusted price is higher than the baseline price (e.g., due to increased demand at the merchant), a surge pricing notification is generated and provided to the merchant. The merchant then increases its prices as indicated in the surge pricing notification to take advantage of the increased demand for its products and services. The advertisement and the surge pricing notification each include an indication of the adjusted price (e.g., as a percentage reduction from the baseline price). The advertisement and the surge pricing notification also can be formatted in a variety of ways. For example, in some arrangements the advertisement or surge pricing notification are each formatted as a text message, an email, a push notification, or a web page.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more dedicated processors communicatively coupled to one or more dedicated memory or memory devices. In this regard, the one or more dedicated processors may execute instructions stored in the dedicated memory or may execute instructions otherwise accessible to the one or more dedicated processors. In some embodiments, the one or more dedicated processors may be embodied in various ways. The one or more dedicated processors may be constructed in a manner sufficient to perform at least the operations described herein. In some embodiments, the one or more dedicated processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more dedicated processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more dedicated processors may take the form of a single core processor, multi-core processor (e.g., a dual core processor, triple core processor, quad core processor, etc.), microprocessor, etc.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method, comprising:

selecting, by a financial institution computing system comprising one or more processors coupled to memory, a baseline time period based on at least one of a month of a current time period, a day of the current time period, and an hour of the current time period;

receiving, by the financial institution computing system from a merchant computing device of a merchant, a first plurality of financial transactions involving the merchant during the baseline time period;

determining, by the financial institution computing system, a total dollar value of the first plurality of financial transactions involving the merchant during the baseline time period;

receiving, by the financial institution computing system from the merchant computing device, a compensation factor selected to compensate for cash transactions that are not available in financial transaction data of the merchant;

calculating, by the financial institution computing system, a baseline payment velocity by multiplying the total dollar value of the first plurality of financial transactions by the compensation factor;

receiving, by the financial institution computing system, a second plurality of financial transactions involving the merchant during the current time period;

determining, by the financial institution computing system, a total dollar value of the second plurality of financial transactions involving the merchant during the current time period;

calculating, by the financial institution computing system, a current payment velocity by multiplying the total dollar value of the second plurality of financial transactions by the compensation factor;

comparing, by the financial institution computing system, the current payment velocity with the baseline payment velocity to determine a difference between the current payment velocity and the baseline payment velocity;

receiving, by the financial institution computing system, from each of a plurality of computing devices, a current location of each of the plurality of computing devices;

determining, by the financial institution computing system, based on current locations of the plurality of computing devices, a number of the plurality of computing devices that are currently located at the merchant;

determining, by the financial institution computing system, an available capacity of the merchant, based on (i) the difference between the current payment velocity and the baseline payment velocity, and (ii) the number of the plurality of computing devices that are currently located at the merchant;

determining, by the financial institution computing system, an adjusted price of at least one product or service offered by the merchant, based on the available capacity;

determining, by the financial institution computing system, that the adjusted price of the at least one product or service is greater than a predetermined threshold;

generating, by the financial institution computing system, responsive to determining that the adjusted price is greater than the predetermined threshold, a network-accessible web page including an indication of the adjusted price; and providing, by the financial institution computing system via a network, the network-accessible web page including the indication of the adjusted price to the merchant computing device for display.

2. The method of claim 1, further comprising receiving, by the financial institution computing system, information relating to a staffing availability of the merchant during the current time period, wherein determining the available capacity of the merchant further comprises determining, by the financial institution computing system, the available capacity of the merchant further based at least in part on the information relating to the staffing availability.

3. The method of claim 1, wherein
determining the adjusted price of the at least one product or service offered by the merchant comprises determining a reduced price of the at least one product or service, the method further comprising:
generating, by the financial institution computing system, an email indicating the adjusted price for the at least one product or service offered by the merchant, wherein the adjusted price is less than a baseline price.

4. The method of claim 3, further comprising transmitting, by the financial institution computing system, the email to the merchant computing device.

5. A system, comprising:
a financial institution computing system comprising one or more processors coupled to memory, the financial institution computing system configured to:
select a baseline time period based on at least one of a month of a current time period, a day of the current time period, and an hour of the current time period;
receive, from a merchant computing device of a merchant, a first plurality of financial transactions involving the merchant during the baseline time period;
determine a total dollar value of the first plurality of financial transactions involving the merchant during the baseline time period;
receive, from the merchant computing device, a compensation factor selected to compensate for cash transactions that are not available in financial transaction data of the merchant;
calculate a baseline payment velocity by multiplying the total dollar value of the first plurality of financial transactions by the compensation factor;

receive a second plurality of financial transactions involving the merchant during the current time period;
determine a total dollar value of the second plurality of financial transactions involving the merchant during the current time period;
calculate a current payment velocity by multiplying the total dollar value of the second plurality of financial transactions by the compensation factory;
compare the current payment velocity with the baseline payment velocity to determine a difference between the current payment velocity and the baseline payment velocity;
receive, from a plurality of computing devices, a current location of each of the plurality of computing devices;
determine, based on current locations of the plurality of computing devices, based on current locations of the plurality of computing devices that are currently located at the merchant, a number of the plurality of computing devices that are currently located at the merchant;
determine an available capacity of the merchant, based on (i) the difference between the current payment velocity and the baseline payment velocity, and (ii) the number of the plurality of computing devices that are currently located at the merchant;
determine an adjusted price of at least one product or service offered by the merchant, based on the available capacity;
determine that the adjusted price of the at least one product or service is greater than a predetermined threshold;
generate, responsive to the determination that the adjusted price is greater than the predetermined threshold, a network-accessible web page including an indication of the adjusted price; and
provide, via a network, the network-accessible web page including the indication of the adjusted price to the merchant computing device for display.

6. The system of claim 5, wherein the financial institution computing system is further configured to:
receive information relating to a staffing availability of the merchant during the current time period; and
determine the available capacity of the merchant further based at least in part on the information relating to the staffing availability.

7. The system of claim 5, wherein the financial institution computing system is further configured to generate an email indicating the adjusted price for the at least one product or service offered by the merchant, responsive to the financial institution computing system determining that the adjusted price of the at least one product or service offered by the merchant is less than a baseline price.

8. The system of claim 7, wherein the financial institution computing system is further configured to transmit the email to the merchant computing device.

* * * * *